(12) United States Patent
Wicker et al.

(10) Patent No.: US 8,949,709 B2
(45) Date of Patent: *Feb. 3, 2015

(54) INSTRUCTING WEB CLIENTS TO IGNORE SCRIPTS IN SPECIFIED PORTIONS OF WEB PAGES

(71) Applicant: International Business Machines Corporation, Armonk, NY (US)

(72) Inventors: Jason M. Wicker, Pittsboro, NC (US); Ryan R. Wilson, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/661,084

(22) Filed: Oct. 26, 2012

(65) Prior Publication Data

US 2013/0185350 A1 Jul. 18, 2013

Related U.S. Application Data

(63) Continuation of application No. 13/348,829, filed on Jan. 12, 2012.

(51) Int. Cl.
*G06F 17/22* (2006.01)
*G06F 9/44* (2006.01)

(52) U.S. Cl.
USPC ........... 715/234; 715/749; 715/760; 717/111; 717/115

(58) Field of Classification Search
USPC ......... 715/200, 205, 226, 234, 255, 256, 273, 715/700, 749, 760, 762, 763; 717/106, 108, 717/111, 114, 115
See application file for complete search history.

(56) References Cited

U.S. PATENT DOCUMENTS

| | | | | |
|---|---|---|---|---|
| 7,308,648 B1 * | 12/2007 | Buchthal et al. | | 715/234 |
| 7,831,995 B2 * | 11/2010 | Futoransky et al. | | 726/1 |
| 7,890,600 B2 * | 2/2011 | Hellstrom | | 709/217 |
| 8,234,712 B2 * | 7/2012 | Ishida et al. | | 726/26 |
| 8,499,283 B2 * | 7/2013 | Mony | | 717/115 |
| 2002/0010855 A1 * | 1/2002 | Reshef et al. | | 713/164 |
| 2004/0260754 A1 * | 12/2004 | Olson et al. | | 709/200 |
| 2007/0107057 A1 * | 5/2007 | Chander et al. | | 726/22 |
| 2007/0204223 A1 | 8/2007 | Bartels et al. | | |
| 2008/0215757 A1 * | 9/2008 | Hellstrom | | 709/246 |

(Continued)

OTHER PUBLICATIONS

Jim et al, "Defeating Script Injection Attacks with Browser-Enforced Embedded Policies," WWW 2007/Track: Security, Privacy, Reliability, and Ethics, May 2007.

*Primary Examiner* — Maikhanh Nguyen
(74) *Attorney, Agent, or Firm* — Jeffrey S. LaBaw; David H. Judson

(57) ABSTRACT

A web client is controlled to actively ignore scripts in certain portions of a web document using control instructions in the form of a special pair of markup language "tags." A tag pair of this type is defined by a first tag, and a second tag paired with the first tag to form the tag pair. Each of the first and second tags includes a same identifier, and the tag pair is adapted to be recognized by a browser interpreter to instruct the web client to ignore given information located with the tag pair. Thus, when a web document is received by a web client, it is parsed (by the interpreter) in the usual manner. Upon determining that the tag pair is present, the browser bypasses (ignores) given information (typically, a script) located with the tag pair. Bypassing the script reduces the possibility that the script can be used for malicious purposes, such as an XSS attack.

9 Claims, 3 Drawing Sheets

(56) References Cited

U.S. PATENT DOCUMENTS

| | | |
|---|---|---|
| 2008/0222736 A1* | 9/2008 | Boodaei et al. .................. 726/27 |
| 2009/0138937 A1 | 5/2009 | Erlingsson et al. |
| 2009/0260087 A1 | 10/2009 | Ishida et al. |
| 2011/0185271 A1* | 7/2011 | Aciicmez et al. .............. 715/234 |
| 2011/0185427 A1 | 7/2011 | Aciicmez et al. |
| 2011/0239294 A1* | 9/2011 | Kim et al. ....................... 726/22 |
| 2012/0090026 A1* | 4/2012 | Andrews et al. ................ 726/22 |
| 2012/0324331 A1* | 12/2012 | Chartier et al. ............... 715/234 |

* cited by examiner

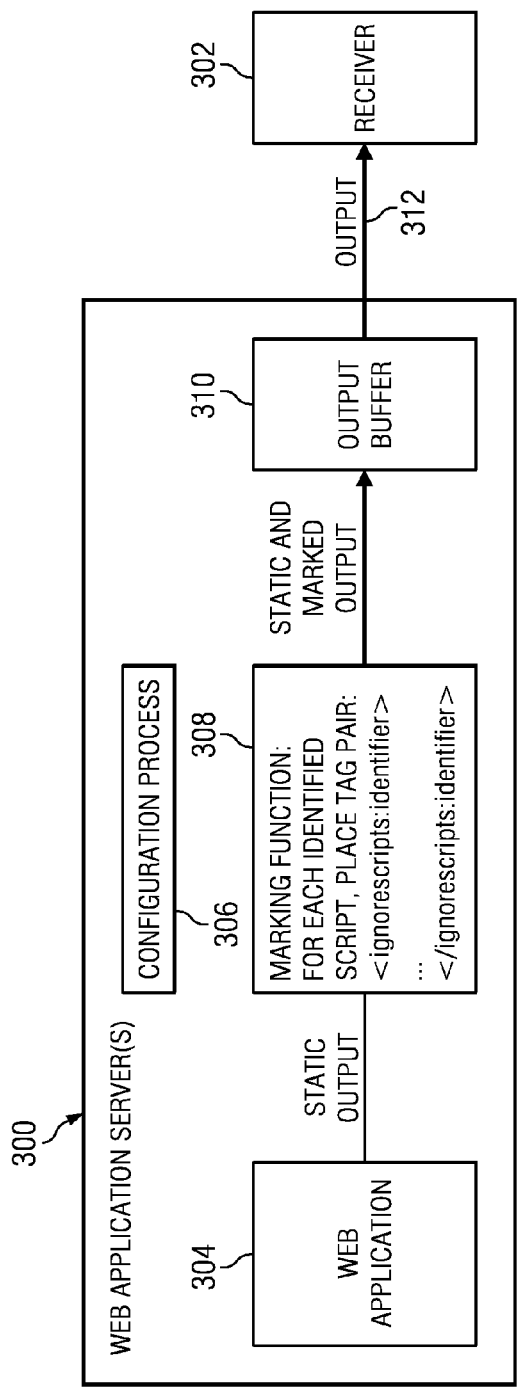

INSTRUCTING WEB CLIENTS TO IGNORE SCRIPTS IN SPECIFIED PORTIONS OF WEB PAGES

COPYRIGHT STATEMENT

A portion of the disclosure of this patent document contains material that is subject to copyright protection. The copyright owner has no objection to the facsimile reproduction of the patent document as it appears in the Patent & Trademark Office file or records, but it otherwise reserves all copyright rights.

BACKGROUND OF THE INVENTION

1. Technical Field

This disclosure relates generally to web application security.

2. Background of the Related Art

Ensuring that modern software systems are free of security vulnerabilities is a daunting task. Such systems often comprise large amounts of code, including third party and remote components. Moreover, the measures that need to be taken to prevent potential attacks, in most cases, are far from straightforward, as they depend on the state of the application, the exact content of the (potentially malicious) data being processed, and the use(s) the application is about to make of that data. The problem is aggravated when it comes to web applications, which by design often feed on untrusted data in the form of user input. Also, web applications often make access to security-sensitive resources, such as databases, file systems or sockets. The problem of securing web applications against malicious attacks therefore has received significant attention.

Cross-Site Scripting (XSS), also known as script injection, is a web application vulnerability that allows malicious users to inject code into pages that are viewed by other users. In many classifications, it is recognized as a top web application vulnerability class. The most severe consequences of XSS issues are that attacker is able to make a legitimate user's browser perform operations that change application state on behalf of that user, or that make a user's browser disclose private data. Typically, cross site scripting attacks attempt to access cookies that the web application uses to implement security features. Cross site scripts, however, also may compromise security in other ways including, without limitation, tricking the user into supplying credentials to the attacker, causing a denial of service type of attack designed to hinder the server (e.g., loops to send emails, loops posting to a forum, or the like), causing a denial of service type of attack designed to hinder the client (e.g., purposefully implementing an infinite client-side processing loop), and delivering security cookies via web application rather than over secure connection.

To guard against cross-site scripting attacks, the web application must parse use input and rewrite any potentially problematic text. This processing may require significant resources. Also, this type of mitigation approach assumes the effectiveness of the parser. Any potential to circumvent the parser necessitates both fixing the parser and applying maintenance, thus incurring further development and administrative overhead.

There are several known methods to protect against an XSS attack. One approach is referred to an input filtering. This approach involves checking web application input for malicious data and rejecting or filtering it as needed. The input filtering method, however, cannot guarantee full protection, and it may be overly aggressive (to the point of being useless) if input data is used by web application in multiple contexts (e.g. HTML and Java Script). An alternative approach is to use client-side protection, whereby users equip their browsers with extensions that automatically detect attack attempts. The client-side approach, however, does not work properly with some types of XSS attacks, especially persistent XSS where injected code is not passed through input parameters. Yet another approach is referred to output escaping. XSS attacks happen when the application fails to escape its output and an attacker put HTML and/or Javascript on the site, which code then runs in the site visitors' web browsers. Output escaping stops this happening by making sure that the application never sends commands (HTML) when it only intends to send plaintext. To be implemented successfully, however, this solution requires significant attention from developers and an active approach from test teams, and it is difficult to implement if the application is a composite created with software from different vendors. Output escaping mechanisms also are difficult to maintain and automate.

One other approach to defeating script injection attacks implements a browser-enforced policy called Document Object Model (DOM) sandboxing. In this approach, the application structures its pages to identify content that might include malicious scripts. The possibly-malicious user content is placed inside of a <div> or <span> element that acts as a sandbox. Within the sandbox, rich content is enabled, but scripts are disabled. When invoked, a hook function examines the document in its parsed representation, namely, a DOM tree. Beginning at the DOM node of the script, the hook function inspects al of the nodes up to the root of the tree, looking for "noexecute" nodes. If such a node is found, the script is not executed. While this approach provides advantages, it is complex to implement and requires the application developer to write and maintain additional scripts within the application pages, thereby increasing development and support costs. Also, the technique does not provide protection against DOM-based XSS attacks.

BRIEF SUMMARY OF THE INVENTION

Generally, this disclosure provides an enhanced technique to cause a web client to actively ignore scripts in certain portions of a web document. The approach is simple to implement, as it does not require a web application developer to write and include custom scripts within the web application pages. To this end, when it is desired to cause a web client to bypass a script, the developer includes control instructions in the form of a special pair of markup language "tags." A tag pair of this type is defined by a first tag, and a second tag paired with the first tag to form the tag pair. Each of the first and second tags includes a same identifier, and the tag pair is adapted to be recognized by a browser interpreter to instruct the web client to ignore given information located with the tag pair. Thus, when a web document is received by a web client, it is parsed (by the interpreter) in the usual manner. Upon determining that the tag pair is present, the browser bypasses (ignores) given information (typically, a script) located with the tag pair. Bypassing the script reduces the possibility that the script can be used for malicious purposes, such as an XSS attack.

Preferably, the first tag provides a start ignore indication, and the second tag provides an end ignore indication. By using the identifier in the second (end) tag, the application developer is not required to write and position additional custom scripts within the document markup itself. Preferably, the identifier is a data string that is generated dynamically each time the web document is provided from the server. In a representative embodiment, the tag pair consists essentially of the first tag defined as <ignorescripts:identifier>, and the second tag is defined as </ignorescripts:identifier>. The approach may be implemented within a document generated from any type of markup language including, without limitation, HTML, XML, or the like.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 is a block diagram of a set of components that provide a server-side system for content marking according to the teachings of this disclosure;

FIG. 4 is a portion of an example web page markup generated by the web application of FIG. 3, and which shows an HTML snippet that includes a "script ignore" instruction according to this disclosure;

FIG. 5 illustrates a preferred embodiment of the "script ignore" instruction within an HTML snippet of a web document;

DETAILED DESCRIPTION OF AN ILLUSTRATIVE EMBODIMENT

Figure 1:
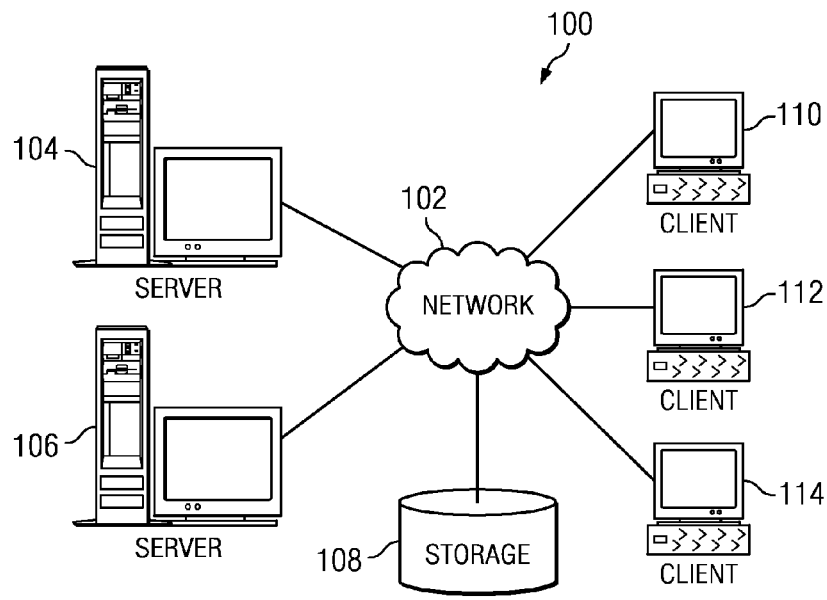
FIG. 1 depicts an exemplary block diagram of a distributed data processing environment in which exemplary aspects of the illustrative embodiments may be implemented.
Figure 2:
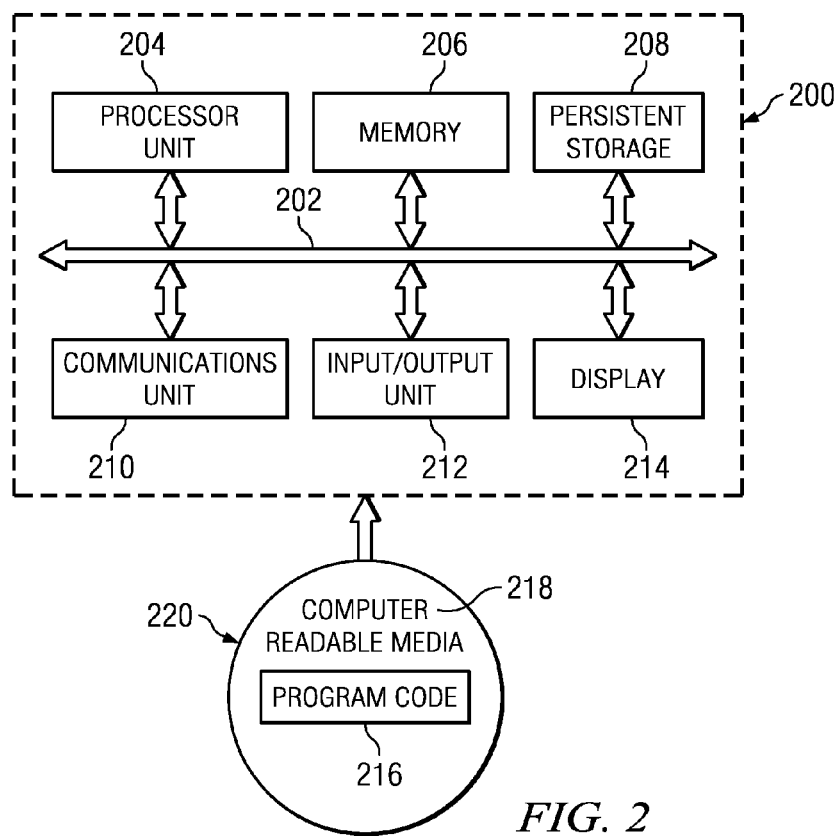
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

FIG. 3 illustrates the high level components of a server-side of a system that augments processing of a web application 304 to include "ignore script" marking according to this disclosure. As shown in FIG. 3, the web application 304 is executing on a web application server or servers 300 in a known manner. A receiver 302 is a client machine that has made a request to the web application server 300 and that is being handled by the web application 304. Typically, a web browser (or other rendering engine) executes on the client (receiver 302). As is well-known, the client browser includes an interpreter that interprets markup language documents. Thus, the receiver 302 and server 304 correspond generally to the "client" and "server" illustrated in FIG. 1. As used herein, the phrase "web application" should be broadly construed to include server-side processes, components and/or functions that generate markup language documents, such as HTML. Web applications typically include, without limitation, an HTTP daemon (namely, a web server), a J2EE servlet, a PHP or equivalent script, an application server, or the like. While the page output from the web application 304 typically is a markup language page such as HTML, this is not a limitation, as the techniques described herein may be implemented with an output that is of any markup language format (e.g., XML, HDML, WML, xHTML, and many others). As is well-known, typically an HTML document is output from the web application 304 in an HTTP request-response exchange as a data stream. The term "browser" likewise should be broadly construed to cover an HTTP browser, plug-in, or other client-side code for outputting (e.g., rendering) markup language or equivalent data.

The system comprises a pair of processes illustrated in FIG. 3 by configuration process 306, and content marking function 308. The configuration process preferably is a menu-driven interface by which a developer identifies one or more portions of a web document that are desired to be "marked" for bypass. The interface (typically an HTML editor) enables the developer to select (i.e., delimit) particular scripts for bypass, and to associate one or more additional control parameters with the page. As will be described, if a script is selected for bypass, the content marking function 308 automatically places the script within a special tag pair. One such additional control parameter that may be selected by the developer causes the special tag pair to include an identifier that is unique to the script. By selecting/de-selecting the control parameters, the developer may cause each particular script (that is to be bypassed) to be located within its own unique tag pair, or that all such scripts (to be bypassed) on the page will use the same tag pair, or the like. Other control parameters, for example, may specify that each script of a certain specified type (as selected by the developer or as generated programmatically) includes the tag pair, that a script inserted from a particular source includes the tag pair, and the like. Although process 306 is shown as implemented within the server application, this is not a requirement, as the configuration may be implemented within a different system or operating environment. In one approach, the configuration is facilitated using a web-based HTML editor. Configuration may be implemented as a hosted or managed service.

The content marking function 308 operates to provide output markings, namely, the tag pairs within which the one or more scripts to be bypassed (on the web client) are positioned. In particular, the content marking function 308 automatically inserts the tag pairs (as defined and configured by the configuration process) around each script that has been selected or otherwise identified for marking. The content marking function 308 thus operates generally to mark each selected/identified script being output by the web application to generate one or more marked outputs. The one or more marked outputs are supplied to an output buffer 310 together with the other (unmarked) portions of the document also generated by the web application. Of course, the number of marked scripts is variable, and there may be one or more marked outputs. The output buffer 310 stores the web application output in the form of a composite page that includes both the static outputs (unmarked) and the tag pairs (marked).

The content marking function 306 may be implemented in one of several ways. A simple approach is to implement it as a library function that the web application 304 calls to mark and render the selected/identified scripts. In an alternative, all script content (generated by the web application in response to the request) is assumed to be at risk and is marked with the special tags.

The content marking function 306 may be standalone code, or code native to the web application itself. The function may comprise one or more instances (distinct processes, programs, executing threads, or the like), and one or more such functions can process multiple applications at the same time. A convenient implementation of the function 306 may be a proxy, such as the server shown in FIG. 1 using the data processing system components shown in FIG. 2. More generally, the function may be implemented as a standalone device or other intermediary, or as a hosted (i.e. managed) service provided by a service provider. As such, the function operates on the document output by the web application without any dependency on the technologies or input source (s) used to generate the document data.

While functions 306 are 308 preferably are decoupled, they also may be integrated. Functions 306 and 308 may also execute on a single machine or process, or in machines (or processes) that are located remotely from one another. The output buffer 310 is any data store or memory, and it may be co-located with one or both of the other functions 306 and 308, or the buffer may be accessible to one or both of the components 306 and 308 remotely. Communications among these component functions and the data store may be secure (e.g., using SSL, TLS, or the like). As already noted, there may be one or more instances of any of the system components.

FIG. 4 is a portion of an example web page markup generated by the web application of FIG. 3, and which shows an HTML snippet that includes a "script ignore" instruction 400 according to this disclosure. As can be seen, preferably the instruction 400 is defined by a markup language tag pair. A tag pair of this type is defined by a first tag 402, and a second tag 404 paired with the first tag to form the tag pair. Each of the first and second tags includes a same identifier 406, and the tag pair is adapted to be recognized by a browser interpreter to instruct the web client to ignore given information located with the tag pair. In this representative embodiment, the tag pair consists essentially of the first tag defined as <ignorescripts:identifier>, and the second tag is defined as </ignorescripts:identifier>. When a web document that includes the tag pair is received by a web client, it is parsed (by the interpreter) in the usual manner. Upon determining that the particular tag pair is present, the browser bypasses (ignores) given information, typically, a script that requests user input 408, that is located with the tag pair. Bypassing the script reduces the possibility that the script can be used for malicious purposes, such as an XSS attack.

Preferably, and as a consequence of the defined syntax for the tag pair, the first tag 402 provides a start ignore indication, and the second tag 404 provides an end ignore indication. By using the same identifier 406 in the second (end) tag, the application developer is not required to write and position additional custom scripts within the document markup itself. Preferably, and with reference now to FIG. 5, the identifier is a data string that is generated dynamically each time the web document is provided from the server. In this representative embodiment, the tag pair thus consists essentially of the first tag defined as <ignorescripts:dynamicQualifier>, and the second tag is defined as </ignorescripts:dynamicQualifier>.

Regardless of the specific value of the "identifier," the approach may be implemented within a document generated from any type of markup language including, without limitation, HTML, XML, or the like. The identifier, however, must be present in the end tag of the tag pair, and it is must be the same identifier used in the start tag of the pair.

Figure 6:
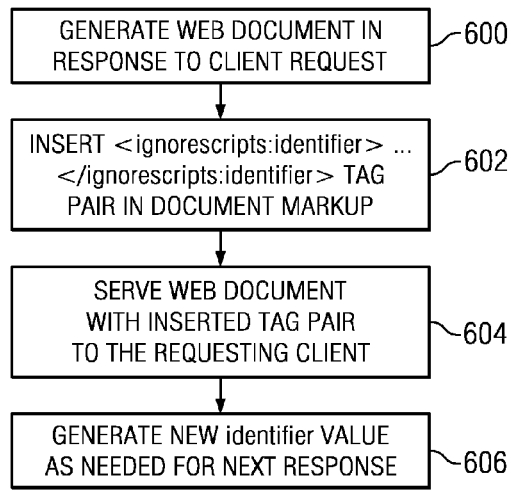
FIG. 6 illustrates a set of server-side operations to generate a web document with the "script ignore" instruction.

FIG. 6 illustrates a set of server-side operations to generate a web document with the "script ignore" instruction. These operations typically are implemented in software executing in a hardware element, such as a processor. The software comprises a set of program instructions held in another hardware element, such as a computer memory or other data storage device. The routine begins at step 600 with the web application generating a web document in response to a client request. At step 602, and as the web document is being written into the output buffer, inserts a "script ignore" instruction in the form of a markup language tag pair. As illustrated in FIG. 5, the tag pair may be in the form <ignorescripts:identifier> . . . </ignorescripts:identifier>. Of course, this particular syntax is not limiting, except (as noted above) that the "identifier" must be included and must be the same for both the start tag and the end tag of the tag pair. At step 604, the web server serves back to the requesting client the web document with the inserted tag pair. The process then continues at step 606 with the generation of a new identifier as needed for a next response. Step 606 is optional in that the same identifier can be used across multiple server responses (even within the same markup language document). In a preferred embodiment, the operation in step 606 is carried out so that each script ignore instruction is unique, even within the context of a single markup language page. This completes the server-side of the processing.

Figure 7:
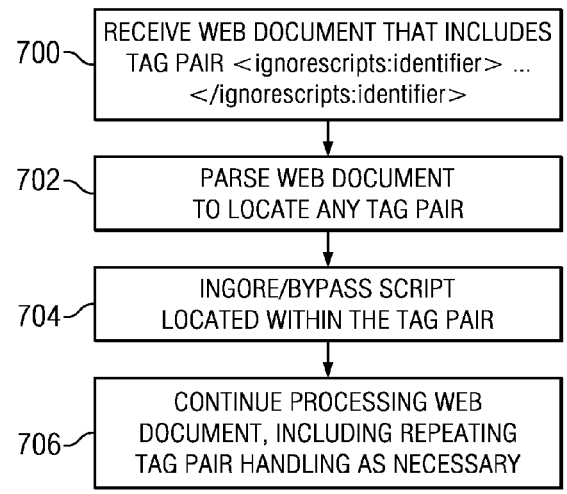
FIG. 7 illustrates a set of client-side operations by which a script within the "script ignore" instruction is bypassed by the interpreter engine of the client browser according to this disclosure.

FIG. 7 illustrates a set of client-side operations by which a script within the "script ignore" instruction in the page markup is bypassed. Once again, preferably these operations typically are implemented in software executing in a hardware element, such as a processor. The software typically is an interpreter of a web browser. More generally, the software comprises a set of program instructions held in another hardware element, such as a computer memory or other data storage device. The routine begins at step 700 with the web browser receives the web document that has been returned from the server, typically in response to a client request. At step 702, the interpreter parses the web document to locate any markup language tag pair. As illustrated in FIG. 5, the tag pair may be in the form <ignorescripts:identifier> . . . </ignorescripts:identifier>. At step 704, the routine bypasses given information located within the tag pair to provide the desired XSS protection. The routine then continues at step 706 to continue processing the web document, including repeating the tag pair handling as necessary (for any other ignore script instructions that may be present within the markup). This completes the client-side of the processing.

As used herein, the web application in which the tag pair may be implemented is not limited to an application over which the developer has complete control. It may only be a so-called Java "portlet" application, or the like. As is well-known, the Java Portlet 1.0 specification defines a portlet application as a Web application that comprises one or more portlets, a Web application deployment descriptor (web.xml), and a portlet deployment descriptor (portlet.xml). A portlet developer may use the techniques herein to protect data from scripts (XSS or otherwise) external to his or her portlet, e.g., using the following type of approach:

```
<ignorescripts:dq12345>
<div id = "id1"> ... </div>
</ignorescripts:dq12345>.
```

This tag pair prevents other scripts on the page from accessing element id1, e.g., by inserting malicious scripts or other content into the element. As another variant, the tag pair may be the following:

```
<ignoreexternalscripts:dq3456>
<div id = "id1"> ... </div>
<! -- portlet's script can modify DOM element id1-- >
</ignoreexternalscript:dq3456>
<! -- external scripts cannot modify DOM element id1 -- >
```

Of course, these examples are merely representative.

To implement the tag script processing, the browser interpreter (or other web client rendering engine, as the case may be) should be constructed and adapted to recognize and process the tag pair syntax in the manner described.

The technique described herein has numerous advantages. Bypassing one or more scripts mitigates script injection attacks when the web client interacts with the web server. The approach is simple to implement, as the application developer is not required to write or maintain additional scripts. The tag pairs provide a simple, yet effective marking to delimit (to the browser interpreter) which web application content should be ignored during processing. The ability to specify a dynamic identifier provides additional protection against attempts to circumvent the protection scheme, and the approach also provides protection against DOM-based XSS attacks.

The block diagrams in the different depicted embodiments illustrate the architecture, functionality and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The disclosed subject matter can take the form of an entirely hardware embodiment, an entirely software embodiment or an embodiment containing both hardware and software elements. In a preferred embodiment, the invention is implemented in software, which includes but is not limited to firmware, resident software, microcode, etc.

The disclosed subject matter can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium is tangible, and it can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In one embodiment, the program instructions are stored in a computer readable storage medium in a data processing system, and these instructions are downloaded over a network from a remote data processing system. In an alternative embodiment, the instructions are stored in a computer readable storage medium in a server data processing system, and the instructions are downloaded over a network to a remote data processing system for use in a computer readable storage medium with the remote system.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As described above, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The description of the disclosed subject matter has been presented for purposes of illustration and description, and is not intended to be exhaustive or limited to the invention in the form disclosed. Many modifications and variations will be apparent to those of ordinary skill in the art. The embodiment was chosen and described to best explain the principles of the invention, the practical application, and to enable others of ordinary skill in the art to understand the invention for various embodiments with various modifications as are suited to the particular use contemplated.

As noted, the techniques described herein may be implemented in or in conjunction with various server-side architectures including simple n-tier architectures, web portals, federated systems, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

Having described our invention, what we now claim is as follows.

The invention claimed is:

1. A method to control a web client, comprising:
receiving a web document from a server, the web document including a first tag having a tag name, and a second tag having the tag name and paired with the first tag to form a tag pair defined by a <tag name: identifier> syntax, each of the first and second tags further including a same identifier that is distinct from the tag name of the tag pair, the tag pair being an instruction to the web client to ignore given information located with the tag pair, the given information being a client-side script;
parsing the web document to attempt to locate the tag pair using the <tag name: identifier> syntax;
determining if the tag pair and its associated same identifier are present; and
when the tag pair and its associated same identifier are present, automatically bypassing the given information located within the tag pair;
wherein the receiving, parsing, determining and bypassing steps are carried out in software executing in a hardware element.

2. The method as described in claim 1 wherein the first tag provides a start ignore indication, and the second tag provides an end ignore indication.

3. The method as described in claim 2 wherein given information includes one or more instructions that allow for an input by a user of the web client.

4. The method as described in claim 3 wherein the input is one of: a user input, and an external input.

5. The method as described in claim 1 wherein the identifier is a data string that is generated dynamically each time the web document is provided from the server.

6. The method as described in claim 1 wherein the first tag is defined as <ignorescripts:identifier> and the second tag is defined as </ignorescripts:identifier>.

7. The method as described in claim 1 wherein the given information is a markup language element and the tag pair prevents an external script from accessing the markup language element.

8. Apparatus, comprising:
a processor;
computer memory holding computer program instructions that when executed by the processor control a web client, the computer program instructions comprising:
program code to receive a web document from a server, the web document including a first tag having a tag name, and a second tag having the tag name and paired with the first tag to form a tag pair defined by a <tag name: identifier> syntax, each of the first and second tags further including a same identifier that is distinct from the tag name of the tag pair, the tag pair being an instruction to the web client to ignore given information located within the tag pair when the tag pair and its associated same identifier are present, the given information being a client-side script;
program code to parse the web document to attempt to locate the tag pair using the <tag name: identifier> syntax;
program code to determine if the tag pair and its associated same identifier are present; and
program code operative when the tag pair and its associated same identifier are present to automatically bypass the given information located within the tag pair.

9. A computer program product in a non-transitory computer readable medium for use in a data processing system, the computer program product holding computer program instructions which, when executed by the data processing system, control a web client, the computer program instructions comprising:
program code to receive a web document from a server, the web document including a first tag having a tag name, and a second tag having the tag name and paired with the first tag to form a tag pair defined by a <tag name:

identifier> syntax, each of the first and second tags further including a same identifier that is distinct from the tag name of the tag pair, the tag pair being an instruction to the web client to ignore given information located within the tag pair when the tag pair and its associated same identifier are present, the given information being a client-side script;

program code to parse the web document to attempt to locate the tag pair using the <tag name: identifier> syntax;

program code to determine if the tag pair and its associated same identifier are present; and program code operative when the tag pair and its associated same identifier are present to automatically bypass the given information located within the tag pair.

* * * * *